US010203814B2

(12) United States Patent
Ryynanen et al.

(10) Patent No.: US 10,203,814 B2
(45) Date of Patent: Feb. 12, 2019

(54) SENSOR ARRANGEMENT COMPRISING A CONDUCTIVE LAYER (75) Inventors: Matti Ryynanen, Helsinki (FI); Marko Karhiniemi, Espoo (FI); Jani Maenpaa, Helsinki (FI); Joonas Ryynanen, Helsinki (FI); Tessa Ryynanen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1227 days.

(21) Appl. No.: 11/409,517

(22) Filed: Apr. 20, 2006

(65) Prior Publication Data
US 2007/0247438 A1 Oct. 25, 2007

(51) Int. Cl.
G06F 3/044 (2006.01)

(52) U.S. Cl.
CPC .................. G06F 3/044 (2013.01)

(58) Field of Classification Search
CPC .............................. G06F 3/044; G06F 3/045
USPC ............................................ 345/173
See application file for complete search history.

(56) References Cited

U.S. PATENT DOCUMENTS

| | | | |
|---|---|---|---|
| 6,259,490 B1 | 7/2001 | Colgan | |
| 8,089,470 B1* | 1/2012 | Schediwy et al. | 345/173 |
| 2001/0013855 A1* | 8/2001 | Fricker et al. | 345/156 |
| 2003/0234769 A1 | 12/2003 | Cross | |
| 2004/0095334 A1* | 5/2004 | Hong | 345/173 |
| 2004/0119701 A1* | 6/2004 | Mulligan et al. | 345/173 |
| 2005/0088416 A1* | 4/2005 | Hollingsworth | 345/173 |
| 2005/0156906 A1* | 7/2005 | Chiu et al. | 345/173 |
| 2006/0238205 A1 | 10/2006 | Francis | |
| 2006/0250373 A1* | 11/2006 | Sakurai et al. | 345/173 |

FOREIGN PATENT DOCUMENTS

| | | |
|---|---|---|
| EP | 0 397 244 | 11/1990 |
| EP | 0 902 387 A2 | 3/1999 |
| WO | 2005/020056 | 3/2005 |

OTHER PUBLICATIONS

Office Action from corresponding European Patent Application No. 07735481.9, dated Jul. 22, 2015.
Office Action from corresponding European Patent Application No. 07735481.9, dated Aug. 24, 2010.
Office Action from corresponding European Patent Application No. 07735481.9, dated Sep. 8, 2009.
International Search Report from International Application No. PCT/IB2007/051320, dated Oct. 2, 2007.
International Preliminary Report on Patentability and Written Opinion from International Application No. PCT/IB2007/051320, dated Oct. 22, 2008.

* cited by examiner

*Primary Examiner* — Dennis Joseph
(74) *Attorney, Agent, or Firm* — Alston & Bird LLP (57) ABSTRACT

A sensor arrangement for an electronic device with user input means comprises a sensor. The sensor is adapted to generate an electric field in an area of the user input means and to enable a detection of a change in the electric field. The sensor arrangement further comprises a conductive web. The conductive web is arranged between the sensor and an external surface of the user input means, in order to concentrate the volume of the generated electrical field.

19 Claims, 5 Drawing Sheets

SENSOR ARRANGEMENT COMPRISING A CONDUCTIVE LAYER

FIELD OF THE INVENTION

The invention relates to a sensor arrangement for an electronic device with user input means. The invention relates equally to an electronic device comprising such a sensor arrangement, to user input means, to a user interface and to a method.

BACKGROUND OF THE INVENTION

The user input means of an electronic device can be implemented in various ways.

One approach for detecting a user input is generating an electrical field and detecting a deformation of the electric field by a user.

The electric field can be associated for instance to the area of a touch-screen. The caused deformation will then depend on the position at which the touch-screen is touched by some object, for instance by a finger of the user. The touched position can thus be determined by evaluating the deformation.

For generating and monitoring such an electrical field, different sensor technologies can be employed. They may be based for instance on a capacitive detector or on a resistive-capacitive detector.

A capacitive detector comprises at least one conductive plate, which forms a capacitance with at least one other conductive plate or an object. With a pure capacitive detector, an electric field is induced and disturbances of the electric field by a user can be detected for instance by monitoring the capacitance values of four capacitors at the four corners of a monitored area. The capacitance values can be used for detecting whether there is some object in close vicinity of the detector or not, and at which position. A grounding around the capacitive detector could be used to reduce the interference by other capacitances in the vicinity and to limit lateral interactions of the capacitive detector.

A Resistive-capacitive detector is a homogeneous or non-homogeneous electrically resistive element, for example a square resistance of 1-5 kOhm. It can be made for instance of a graphite paper, or of a plastic foil with a conductive, transparent indium tin oxide (ITO) layer. With a resistive-capacitive detector, again an electric field is induced. In this case, however, the varying resistance is used in a position calculation. Changes in the resistance can be detected as changes in an electrical current. A resistive-capacitive detector can be used for instance for realizing sliders, touchpads, keypads, etc.

User input technologies that are based on a deformation of an electric field in free air can be realized in a robust manner at low costs. However, their usability is limited, because the detection of a deformation is rather sensitive.

The field strength is not equally distributed over a monitored area. Therefore, sensitivity and resolution are different in different areas of the field source, which makes it difficult to calibrate the sensor for enabling a calculation of the correct position. Moreover, an electric field that is based on a strong source is far reaching and the lines of force of the field are bended. Therefore, an object will cause a deformation of the field already when approaching a desired position of a monitored area, and the signal will change only slowly with increasing proximity. This makes it is difficult to set a threshold level for the detection of a touch. Also different finger sizes and gloves put demands on setting the threshold level of the sensor.

These problems are also of relevance in case a single large sensor, like a large resistive-capacitive detector, is used for several keys of a keypad. The free field form complicates the algorithm that is used for determining the key that a user presses based on a detected deformation. If a user is not concentrated in a proper action of pressing a key, a false key may be indicated, which reduces the usability of the keypad significantly.

SUMMARY OF THE INVENTION

It is an object of the invention to increase the usability of user input means that rely on the detection of a deformation of an electric field.

A sensor arrangement for an electronic device with user input means is proposed. The sensor arrangement comprises a sensor adapted to generate an electric field in an area of the user input means and to enable a detection of a change in the electric field. The sensor arrangement further comprises a conductive web arranged between the sensor and an external surface of the user input means.

Moreover, an electronic device is proposed, which comprises user input means and such a sensor arrangement.

Moreover, user input means for an electronic device are proposed. The user input means comprise a component providing an external surface of the user input means. The user input means further comprise a sensor adapted to generate an electric field in an area of the user input means and to enable a detection of a change in an energy of the electric field. The user input means further comprise a conductive web arranged between the sensor and the external surface of the user input means.

Finally, a method is proposed, which comprises arranging a sensor in an electronic device. The sensor is adapted to generate an electric field and to enable a detection of a change in an energy of the electric field. The method further comprises arranging a component providing an external surface of user input means in the electronic device such that an electric field generated by the sensor is generated in an area of the user input means. The method further comprises arranging a conductive web between the sensor and an external surface of the user input means.

It is to be understood that the user input means are not limited to pure input means. They could also be a general user interface providing for instance input and output functions.

The invention proceeds from the consideration that an electric field can be modulated by a conductive component that is arranged in the electric field. It is therefore proposed that a conductive web is provided above the sensor, but not in contact with the sensor. Such a conductive web modulates the electric field penetration permanently in a known manner. The conductive web is thus employed as a field modulator. It is suited to compress the field in the vicinity of the sensor and to linearize the sensitivity of the sensor.

It is an advantage of the invention that it allows increasing the accuracy of the detection of a user input and rendering the evaluation of detected changes of the electric field less complex.

As a result, the usability of easy to implement, robust and cheap sensors is increased.

The sensor can be of any type that generates an electric field and that evaluates a deformation of this field, for example a change of energy, as a basis for detecting a user input. The sensor can be for instance a conventional resistive-capacitive detector or a conventional capacitive detector.

For a resistive-capacitive detector, for instance, the use of a conductive web allows forming the induced electric field as desired. For example, the detection sensitivity for a touchpad can be made linear for x-y positions, that is, for positions in a Cartesian coordinate system projected onto the surface of the touchpad. The detection sensitivity denotes the dependence of the measurement results from the distance of an object to the detector in z-direction, that is, in a direction having an increasing distance to the surface of the touchpad. Further, the tuned sensitivity in z-direction can be diminished.

For capacitive detectors, for instance, the use of the conductive web simplifies in particular its calibration.

The sensor arrangement may be adapted to enable a user input via various types of user input means. The input means may include for example one or more of a touchpad, a touch-screen, a slider and a keypad. If the input means include a slider, the slider may be formed as a line, but it is to be understood that it could have any other form as well, for example the form of a circle, of an S-curve or of a C-curve, etc.

The costs of a device can be reduced in particular, in case a single sensor is used for two or more user input means of a device, for instance for a touch-screen and a keypad. In this case, the sensor is adapted to generate an electric field in an area of a plurality of user input means of an electronic device, and a respective conductive web is arranged between an external surface of each of the user input means and a respectively associated portion of the sensor.

For a slider, a touchpad and a touch-screen, etc., the invention is in particular suited to provide an adequate sensitivity, which may be properly tuned to be the same over the entire input area to achieve a good usability.

In keypad or keyboard applications, the conductive web can be arranged to separate the detection areas of different keys and thus to shield the keys from each other. Combining the modulating conductive web with a proper sensor algorithm, which uses the benefit of the generated not acceptable signal areas in between the key areas, reduces the possibilities of a faulty input and thus the number of erroneous interactions.

The web can have the form of a grid, but depending on the input means, it can also be designed in any other suitable way.

In one embodiment of the invention, the conductive web is grounded. The extent of the compression of the electric field and the achieved resolution can then be adjusted by varying the resistance of the material used for the web, by varying the pitch of the web and in addition by choosing a proper grounding resistance. Alternatively or in addition, it would be possible to apply a voltage to the web and to modulate the electric field by selecting a suitable value for the applied voltage. Using only a grounding resistor for manipulating the electric field has the advantage that it is the cheaper alternative. A further possibility of tuning the modulation that is applied by the conductive web is adjusting the distance between the sensor and the conductive web, optionally in a non-uniform manner.

The conductive web can be made of different materials. It could be made for instance of metal wires or carbon filaments. Further, it could be made of conductive plastic, conductive metal ceramics or conductive composites. ITO could be used to implement the conductive web in the form of a transparent conductive coating. The conductive web could equally be made of conductive ink.

The conductive web could be integrated into a component of the user input means, which component provides the external surface. For a touch-screen, it could be integrated for instance into a shield window of a display of the electronic device, and for a touchpad or a slider, it could be integrated for instance into some part of a cover of the electronic device. Alternatively, it could be arranged on an internal surface of a component of the user input means, which provides the external surface of the user input means. The internal surface is a surface which is arranged within the electronic device and which is facing away from the external surface. In this alternative, the conductive web could be printed for instance with conductive ink onto the component, for instance onto the internal surface of a shield window.

In case the sensor is to be used for a touch-screen, the view of the user onto the presentation of a display should not be disturbed. Thus, the conductive web should not be visible to a user. To this end, the connecting elements of the web should be much thinner than the resolution of the human eye. Alternatively, the conductive web could be made of a transparent material. In case the sensor is to be used for a keypad, the visibility of the conductive web will typically not be an issue.

The sensor arrangement or the user input means or the electronic device could also comprise a processor. The processor is adapted to evaluate a change of the electric field for determining a position of a touch by a user on the user input means. The sensor could be connected to this end directly to the processor or via some intermediate measurement circuitry providing preprocessed information on detected changes in the electric field to the processor.

The conductive web could also act as an additional sensor. It may be connected to this end directly or via some intermediate measurement circuitry to a processor. This approach allows refining or validating the measurement results of the primary sensor.

The invention can be employed for any electronic device having at least one sensor that generates an electric field and that detects a deformation of this field for detecting a user input.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
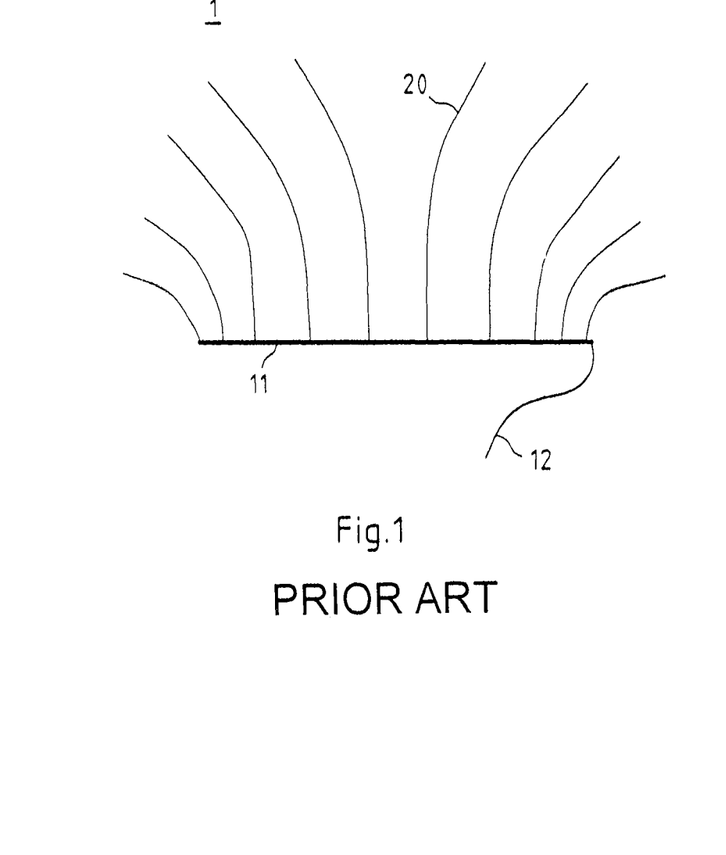
FIG. 1 is a schematic diagram illustrating the electric field resulting with a conventional sensor arrangement using a resistive-capacitive detector.

FIG. 1 is a schematic diagram presenting a conventional sensor arrangement 1 and the electric field resulting with such a sensor arrangement 1.

The sensor arrangement 1 comprises a resistive-capacitive detector as a sensor. The resistive-capacitive detector may include for instance a resistor film 11 for a touch-screen. Alternatively, it could be a wire or wires for a slider.

An AC voltage is applied to the resistor film 11, causing a known electric field. The voltage may be applied to one, multiple or every corner of the resistor film 11, depending on the desired implementation. It is most feasible to apply the voltage to every corner, which simplifies the calculations.

A wire 12 connects the resistor film 11 to a measurement circuitry (not shown). When the electric field is disturbed, for instance because a user touches the touch-screen or the slider, the current is passing to the user body from the resistor film 11 via the capacitive-capacitive connection between resistor film 11 and the finger. The finger thereby changes the impedance of the measurement circuitry, which is can be registered by the measurement circuitry. There are multiple solutions how to measure the impedance and the impedance changes, which are well known to a skilled person.

It can be seen that the lines of force 20 of the electric field that is generated by the resistor film 11 are far reaching, not equally spaced and bent. All these characteristics reduce the usability of the resistive-capacitive detector 1.

Figure 2:
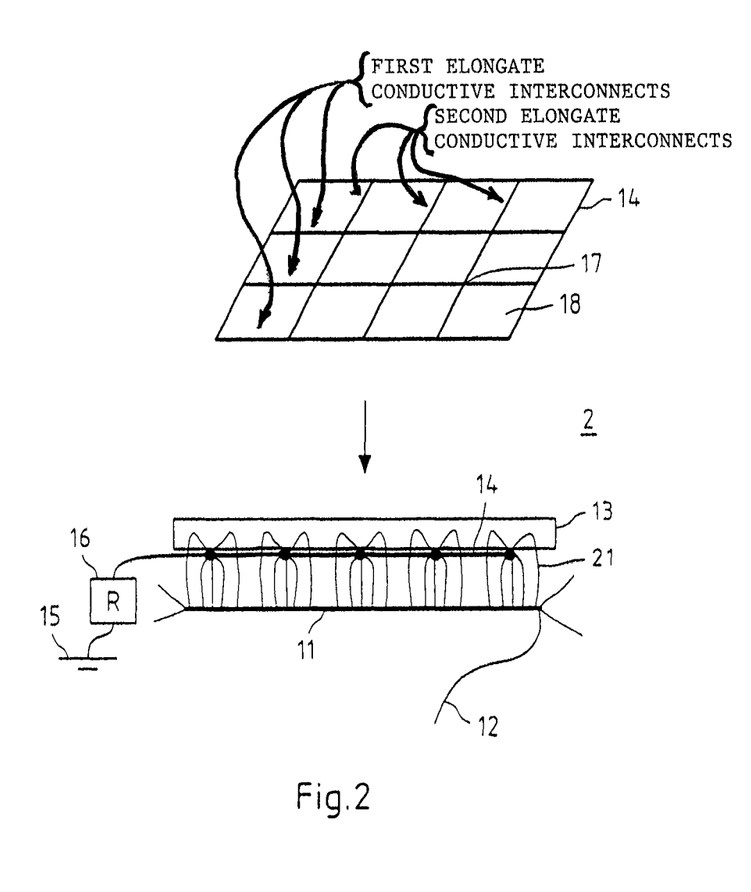
FIG. 2 is a schematic diagram of a sensor arrangement according to a first embodiment of the invention using a resistive-capacitive detector and the resulting electric field.

FIG. 2 is a schematic diagram presenting a sensor arrangement 2 according to a first embodiment of the invention, which enables an improved detection of the position of a touch.

The sensor arrangement 2 comprises again a resistive-capacitive detector including a resistor film 11. The resistive-capacitive detector may be the same as in the case of FIG. 1.

In addition, a panel 13 is shown which may be the screen of a touch-screen or of a slider. Such a panel may also be present in the sensor arrangement 1 of FIG. 1. The panel 13 is arranged at a short distance coplanar to the resistor film 11. It has to be noted, though, that the distance between the resistor film 11 and the panel 13 could also be used for tuning purposes, and in this scope, the distance could also be different in different parts of the detector.

In contrast to the sensor arrangement 1 of FIG. 1, a grid 14 of very thin, conductive metal wires is applied to the side of the panel 13 facing the resistor film 11. The grid 14 is indicated in addition above the sensor arrangement 2 in a top view showing a first plurality of first elongate conductive interconnects oriented in a first direction and a second plurality of second elongate conductive interconnects oriented in a second direction substantially perpendicular to the first direction so as to define a third plurality of mesh eyes or apertures 18. As shown, each of the third plurality of apertures 18 is bounded by portions of a pair of adjacent first elongate conductive interconnects and portions of a pair of adjacent second elongate conductive interconnects.

If the panel 13 is a panel of a touch-screen, the thickness of the wires should be significantly lower than the resolution of the human eyes. Alternatively, the wires could be made of a conductive transparent material, like ITO or one of the other materials mentioned further above.

It has to be noted that the grid 14 could also be integrated within the panel 13. Further, instead of metal wires, it could be made of carbon filaments. Further, it could be printed onto the panel with conductive ink.

The grid 14 is connected to ground 15 via a grounding resistance 16.

Due to the grounded grid 14, the electric field caused by the resistor film 11 is concentrated to the vicinity of the eyes of the grid, as indicated with force lines 21. Any disturbance of the electrical field, which is registered via wire 12, can now be clearly associated to a limited region of the resistor film 11, namely to a region that is associated to a particular intersection 17 of the grid 14. Further, the sensitivity of the sensor arrangement 2 to objects at a distance to the panel 13 is diminished, because the grid 14 prevents the electrical field from reaching beyond the panel 13 with a noteworthy strength.

The concrete properties of the modulation that is applied to the electrical field can be tuned by adjusting the pitch of the grid 14, that is, the size of the mesh eyes 18 of the grid 14, the resistance of the wires of the grid 14 and the value of the grounding resistance 16. The pitch of the grid 14 determines in particular the dependency of the sensitivity from the x-y position and from the z-distance from the resistive-capacitive detector.

Figure 3:
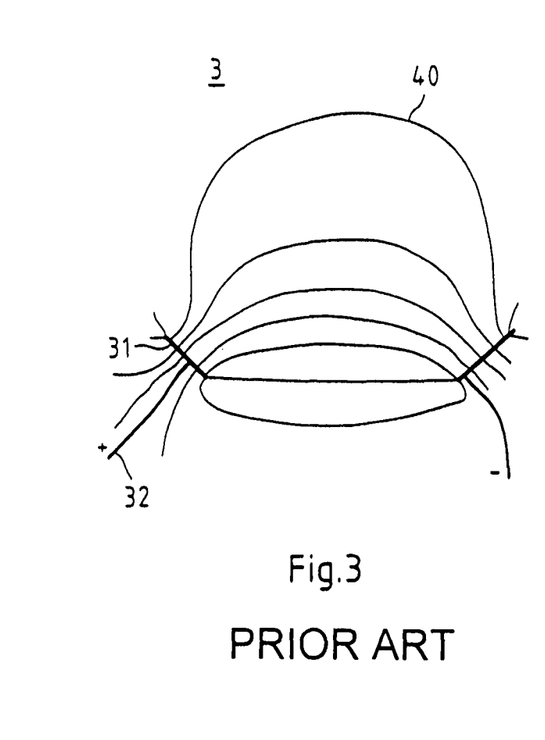
FIG. 3 is a schematic diagram illustrating the electric field resulting with a conventional sensor arrangement using a capacitive detector.

FIG. 3 is a schematic diagram presenting a conventional sensor arrangement 3 and the electric field resulting with such a sensor arrangement 3.

The sensor arrangement 3 comprises as a sensor a capacitive detector. The capacitive detector includes two plates 31 arranged at a distance to each other with a suitable inclination. The capacitive detector may be for instance a detector of a touch-screen and the pates 31 may be arranged at two edges of the touch-screen. A voltage is applied to the two plates 31 via two wires 32 with the indicated polarity '+' and '−', causing a known electric field between them. When the electric field is disturbed, for instance because a user touches the touch-screen, this can be registered as a change of the capacitance.

The capacitive detector has a simple geometry, and such capacitive detectors are not linear. It can be seen that the lines of force 40 of the electric field are again far reaching, not equally spaced and bend. As a result, the resolution and the sensitivity are highly non-linear as well. This largely reduces the usability of the capacitive detector.

Figure 4:
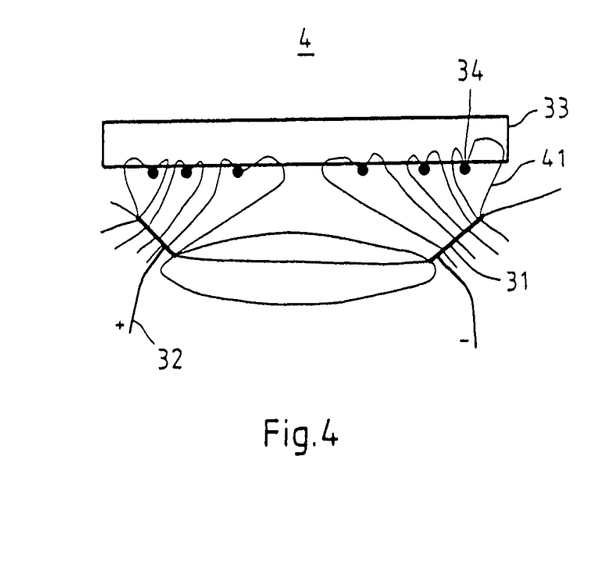
FIG. 4 is a schematic diagram of a sensor arrangement according to a second embodiment of the invention using a capacitive detector and the resulting electric field.

FIG. 4 is a schematic diagram presenting a sensor arrangement 4 according to a second embodiment of the invention, which enables an improved detection of the position of a touch.

The sensor arrangement 4 comprises again a capacitive detector including two plates 31. The capacitive detector may be the same as in the case of FIG. 3.

In addition, a panel 33 is shown which may be the screen of a touch-screen. Such a panel may also be present in the sensor arrangement 3 of FIG. 3. The panel 33 is arranged at a short distance above the plates 31 of the capacitive detector.

In contrast to the sensor arrangement 3 of FIG. 3, a grid 34 of very thin, conductive metal wires is applied to the side of the panel 33 facing the capacitive detector. The grid 34 can be made of different conductive materials and using various techniques, as in the embodiment of FIG. 2. The grid 34 is connected again to ground via a grounding resistance (not shown).

Due to the grid 34, the electric field caused by the plates 31 of the capacitive detector and thus the detector volume of the capacitive detector is concentrated to the vicinity of a particular mesh.

Any disturbance of the electrical field can now be associated to a limited region of the capacitive detector, namely to a region that is associated to a particular intersection of the grid 34.

The concrete modulation properties can be tuned again by adjusting the pitch of the grid 34, the resistance of the wires of the grid 34 and the value of the grounding resistance. Thereby, the detector sensitivity can be set properly for different purposes.

Figure 5:
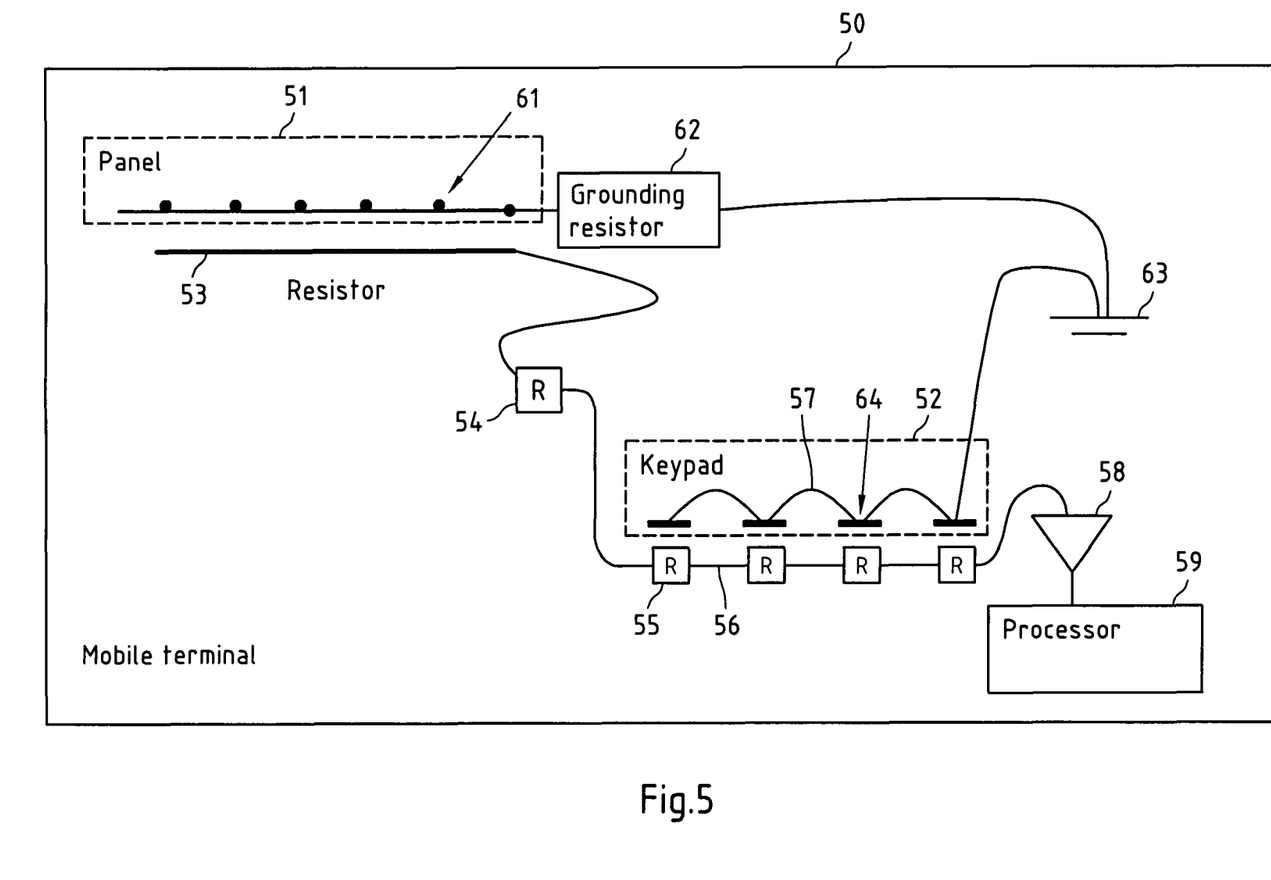
FIG. 5 is a schematic diagram of an electronic device according to an embodiment of the invention.

FIG. 5 is a schematic diagram of an electronic device 50 according to an embodiment of the invention.

By way of example, the electronic device 50 could be a mobile terminal. The mobile terminal 50 comprises a panel 51 and a keypad 52. The panel 51 is the shield window of a display of the device 50 and belongs to a touch screen. On the panel 51, a touch is to be detectable continuously at any position. On the keypad 52, only a touch of a respective key is to be detectable.

A single resistive-capacitive detector is used for detecting a user input via the panel 51 or the keypad 52.

More specifically, a resistor film 53 is arranged in a distance-tuned manner close to the panel 51. The resistor film 53 is connected via a resistor 54 to a series connection of resistors 55, which are interconnected by conductors 56. Each conductor 56 between two resistors of the series connection 56 is associated to and arranged below another key 57 of the keypad 52. The resistor film 53, the resistor 54 and the series connection of resistors 55 belong to the single resistive-capacitive sensor. With such a single detector 53-55, the costs of the device 50 are reduced.

The last resistor of the series connection of resistors 55, finally, is connected via a signal amplifier 58 to a processor 59, either directly or via a measurement circuitry (not shown).

It has to be noted that while the keys 57 are presented one beside the other, they are actually arranged in several rows, just like in a common keypad.

The panel 51 comprises a conductive grid 61, which is connected via a grounding resistor 62 to ground 63. As described with reference to FIG. 2, the grid 61 may be integrated into the panel 51 or be arranged on the surface of the panel 51 facing the resistor 53. In addition, a shock absorber may be laminated onto the panel 51.

A further grid 64 is arranged above the series connection of resistors 55 and below or within the keypad 52. This grid 64 is equally connected to ground 63. The wires of grid 64 do not have to be as thin as those of grid 61 have to be, because they are not visible below or in the keypad 52. They should be flat in order to increase the thickness of the device 50, but their width can fill the entire space between the keys 57 for a proper separation of the keys.

The resistor 53 generates a known electric field that is modulated by grounded grid 61 as described with reference to FIG. 2, and resistors 55 generate a known electric field that is modulated by grounded grid 61 in a corresponding way. The current that is conducted via resistors 53-55 is amplified by signal amplifier 58 and evaluated by processor 59. Due to the grounded grids 61, 64, the processor 59 can be easily calibrated to differentiate between a touch at any position of the panel 51 and a touch of any of the keys 57, when detecting a disturbance of the electric fields. Optionally, a measurement circuit connected to the signal amplifier 58 could preprocess the current and provide corresponding measurement results, possibly in digital form, to the processor 59 for further evaluation.

In conventional keypad applications, resistors are arranged in the area of the keys. If these resistors are replaced by conductors and the resistors are arranged under a conductive web but without a contact with the conductive web as proposed, the resolution of the sensor is fully in use to separate different keys. This way, it is possible to implement a keypad 52 and a touch-sensitive panel 51 of high usability with a single sensor 53-55, since the sensor dynamic is properly used. In the areas of a touch-sensitive panel 51, the resistor film 53 is "seen" trough the conductive web 61 with a proper pitch, but in the area of a keypad 52, the resistors 55 that differentiate the keys 57 from each other are under the conductive web and a conductor 56 is "seen" at the key positions.

Figure 6:
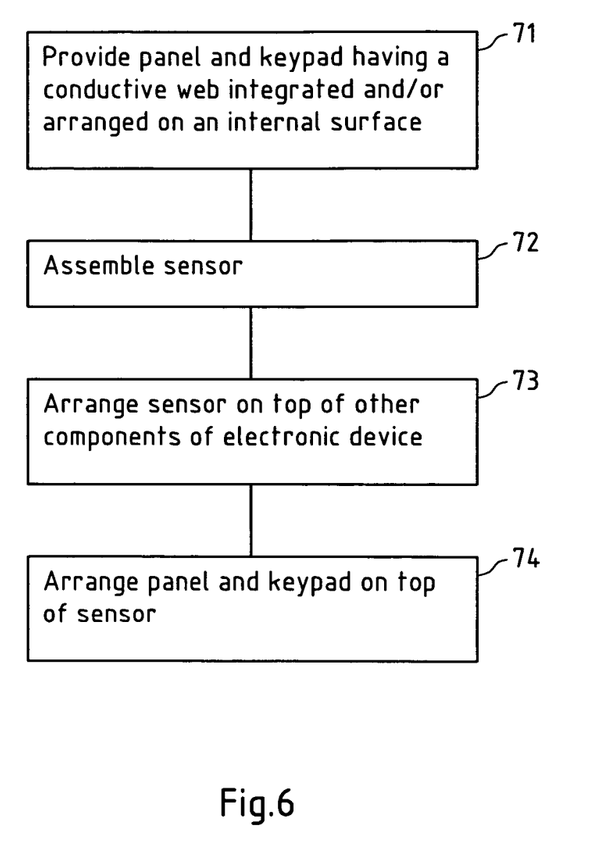
FIG. 6 is a flow chart illustrating an exemplary manufacturing of the electronic device of FIG. 5.

FIG. 6 is a flow chart illustrating an exemplary process for manufacturing the electronic device 50 of FIG. 5.

As a preparatory step, a conductive web is combined with a component of a user interface providing an external surface (step 71). For example, a panel 51 for a touch screen is produced to comprise a first integrated conductive web 61 and a second conductive web 64 is printed onto an available keypad 52. The conductive webs 61, 64 are designed such that they are suited for a desired field modulation. A grounding resistor 62 may be connected to one or both of the conductive webs 61, 64. The value of the grounding resistor 62 is selected such that it is suited for a desired field modulation.

Further, a sensor is assembled, for example by combining a resistor film 53 with a series connection of further resistors 54, 55 (step 72). The sensor is connected to an amplifier 58 and possibly to a separate measurement circuitry.

The assembled sensor is now arranged in the electronic device 50 on top of already assembled conventional components of the electronic device 50, which include a processor 59 (step 73). The sensor is arranged such that the output of the amplifier 58 or of the measurement circuitry connects to the processor 59.

The prepared component of a user interface providing an external surface is then arranged on top of the sensor (step 74). It is arranged such that the conductive webs 61, 64 connect to a grounding terminal 63 provided by the already assembled components, either directly or via the provided grounding resistor 62.

In a further embodiment of an electronic device according to the invention, the conductive web, which is used for spatially modulating an electric field, is employed in addition as a second detector. An example of such an embodiment is illustrated in FIG. 7.

Figure 7:
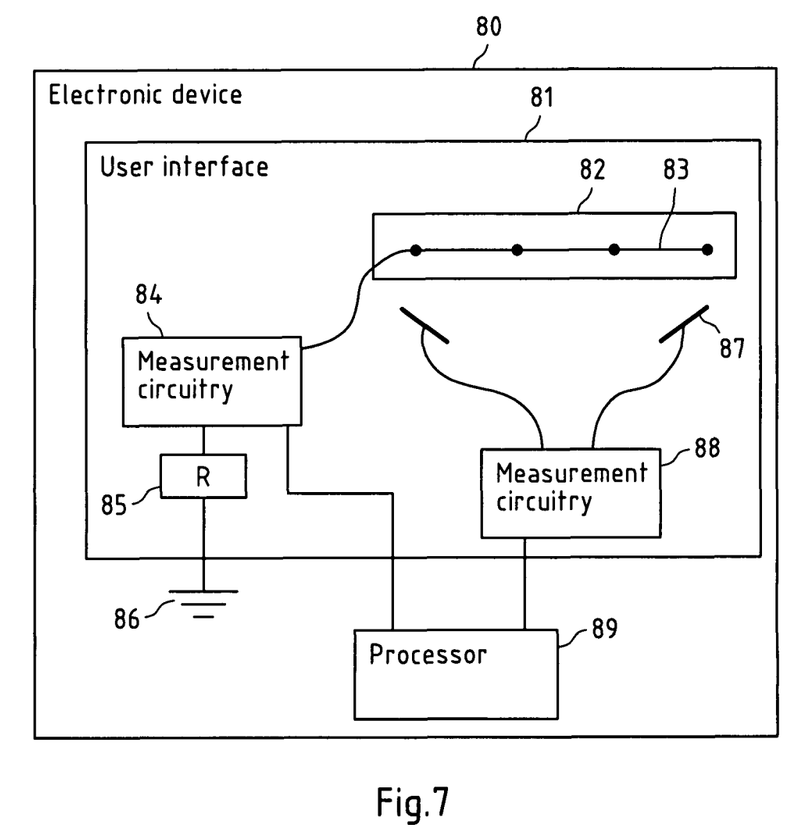
FIG. 7 is a schematic diagram of an electronic device according to a further embodiment of the invention.

FIG. 7 presents an electronic device 80 with a user interface 81. The user interface 81 include a component 82 providing an external surface of the user interface 81. The component 82 providing an external surface can be for instance a keypad. It is provided with a conductive web 83. The conductive web 83 is connected via measurement circuitry 84 and a grounding resistor 85 to ground 86. The user input means 81 further include a capacitive detector 87 arranged below the keypad 82. The capacitive detector 87 is equally connected to a measurement circuitry 88.

An output of both measurement circuitries 84, 88 is connected to a processor 89, which may be internal or external to the user interface 81. The processor 89 could be for instance a general processor 89 of the electronic device 80.

When the capacitive detector 87 generates an electrical field in the area of the keypad 82 and this field is disturbed by a user, this is detected on the one hand by the measurement circuitry 88 associated to the capacitive detector 87 and on the other hand by the measurement circuitry 84 associated to the conductive web 83. Both measurement circuitries 84 provide the measurement results to the processor 89. By combining the information from measurement circuitry 84 with the information from measurement circuitry 88, the processor 89 is able to further clarify a user input, especially in case the user interface includes buttons. With this approach, the context awareness of the electronic device 80 can thus be enhanced and ambiguous input from the measurement circuitry 88 associated to the capacitive sensor 87 can be rejected.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sensor arrangement comprising:
   a capacitive sensor configured to generate an electric field in an area of a panel of an electronic device and detect a change in the electric field due to a user input disturbance, the panel arranged at a distance from the capacitive sensor; and
   a grid disposed between the capacitive sensor and an external surface of the panel, the grid comprising a first plurality of electrically conductive lines disposed, at least in part, between the capacitive sensor and the external surface of the panel and arranged in a first direction and a second plurality of electrically conductive lines disposed, at least in part, between the capacitive sensor and the external surface of the panel and arranged in a different second direction such that the first plurality of electrically conductive lines intersects with the second plurality of electrically conductive lines at a plurality of intersections of the grid disposed, at least in part, between the capacitive sensor and the external surface of the panel and forming a plurality of mesh eyes, wherein the grid is not in contact with the capacitive sensor.

2. The sensor arrangement according to claim 1, wherein the grid is electrically grounded, and the capacitive sensor is arranged to receive a voltage for generating the electric field.

3. The sensor arrangement according to claim 2, wherein the grid is connected to an electrical ground via a resistor.

4. The sensor arrangement according to claim 1, wherein the electric field is concentrated to the vicinity of the mesh eyes of the grid.

5. The sensor arrangement according to claim 4, wherein the capacitive sensor is configured to detect a user input disturbance based on a change in the electric field in a region that is associated to a particular intersection of the grid.

6. The sensor arrangement according to claim 5, wherein said disturbance is caused by a touch by a user at a touch position, said sensor arrangement further comprising a processor operatively connected to the capacitive sensor and configured to determine the touch position based on the change in the electric field in the region that is associated to a particular intersection of the grid.

7. The sensor arrangement according to claim 1, wherein the grid is arranged on a surface of the panel.

8. The sensor arrangement according to claim 1, wherein the panel comprises a touch-screen.

9. The sensor arrangement according to claim 1, wherein the grid comprises a pitch and the capacitive sensor has a positional sensitivity determined by the pitch.

10. The sensor arrangement according to claim 1, wherein said sensor comprises a resistive-capacitive sensor.

11. The sensor arrangement according to claim 1, wherein the user input comprises at least one of
    a touch-pad;
    a touch-screen;
    a slider; and
    a keypad.

12. The sensor arrangement according to claim 1, wherein the first plurality of electrically conductive lines and the second plurality of electrically conductive lines are made of one of:
    metal wires;
    carbon filaments;
    indium tin-oxide;
    conductive plastic; and
    conductive ink.

13. A user interface comprising:
    a panel;
    a capacitive sensor configured to generate an electric field at least between the panel and the capacitive sensor and to detect a change in the electric field due to a user input disturbance; and
    a grid disposed between the capacitive sensor and an external surface of the panel, the grid comprising a first plurality of electrically conductive lines disposed, at least in part, between the capacitive sensor and the external surface of the panel and arranged in a first direction and a second plurality of electrically conductive lines disposed, at least in part, between the capacitive sensor and the external surface of the panel and arranged in a different second direction such that the first plurality of electrically conductive lines intersects with the second plurality of electrically conductive lines at a plurality of intersections disposed, at least in part, between the capacitive sensor and the external surface of the panel, for forming a plurality of mesh eyes, wherein the grid is not in contact with the capacitive sensor.

14. The user interface according to claim 13, wherein the panel further comprises an internal surface opposing the external surface, the internal surface facing the capacitive sensor, wherein the external surface comprises a touch-screen configured to receive a touch object by a user and the capacitive sensor is configured to detect a change in the electric field caused by the touch object.

15. An electronic device comprising a user input and a sensor arrangement, said sensor arrangement comprising:

a capacitive sensor configured to generate an electric field in an area of the user input and to detect a change in the electric field, the user input comprising a panel; and a grid disposed between said capacitive sensor and an external surface of the panel, the grid comprising a first plurality of electrically conductive lines disposed, at least in part, between the capacitive sensor and the external surface of the panel and arranged in a first direction and a second plurality of electrically conductive lines disposed, at least in part, between the capacitive sensor and the external surface of the panel and arranged in a different second direction such that the first plurality of electrically conductive lines intersects with the second plurality of electrically conductive lines at a plurality of intersections of the grid disposed, at least in part, between the capacitive sensor and the external surface of the panel and forming a plurality of mesh eyes, wherein the grid is not in contact with the capacitive sensor.

16. A method comprising:

providing a panel;

arranging a capacitive sensor at a distance from said panel, the capacitive sensor configured to generate an electric field at least between the panel and the capacitive sensor and to detect a change in the electric field due to a user input disturbance; and disposing a grid between the capacitive sensor and an external surface of the panel, the grid comprising a first plurality of electrically conductive lines disposed, at least in part, between the capacitive sensor and the external surface of the panel and arranged in a first direction and a second plurality of electrically conductive lines disposed, at least in part, between the capacitive sensor and the external surface of the panel and arranged in a different second direction such that the first plurality of electrically conductive lines intersects with the second plurality of electrically conductive lines at a plurality of intersecting points disposed, at least in part, between the capacitive sensor and the external surface of the panel, for forming a plurality of mesh eyes, wherein the grid is not in contact with the capacitive sensor.

17. The method according to claim 16, further comprising:

electrically grounding the grid; and applying a voltage to the capacitive sensor for generating the electric field.

18. A device comprising:

means for providing a panel;

means for arranging a capacitive sensor configured to generate an electric field at least between the panel and the capacitive sensor and to detect a change in the electric field due to a user input disturbance; and means for arranging a grid between the capacitive sensor and an external surface of the panel, the grid comprising a first plurality of electrically conductive lines disposed, at least in part, between the capacitive sensor and the external surface of the panel and arranged in a first direction and a second plurality of electrically conductive lines disposed, at least in part, between the capacitive sensor and the external surface of the panel and arranged in a different second direction such that the first plurality of electrically conductive lines intersects with the second plurality of electrically conductive lines at a plurality of intersections disposed, at least in part, between the capacitive sensor and the external surface of the panel, for forming a plurality of mesh eyes, wherein the grid is not in contact with the capacitive sensor.

19. The device according to claim 18, further comprising:

means for electrically grounding the grid; and means for providing a voltage to the capacitive sensor for generating the electric field.

* * * * *